T. Thorn. Elevator Brake.
No. 119,800. Patented Oct. 10, 1871.
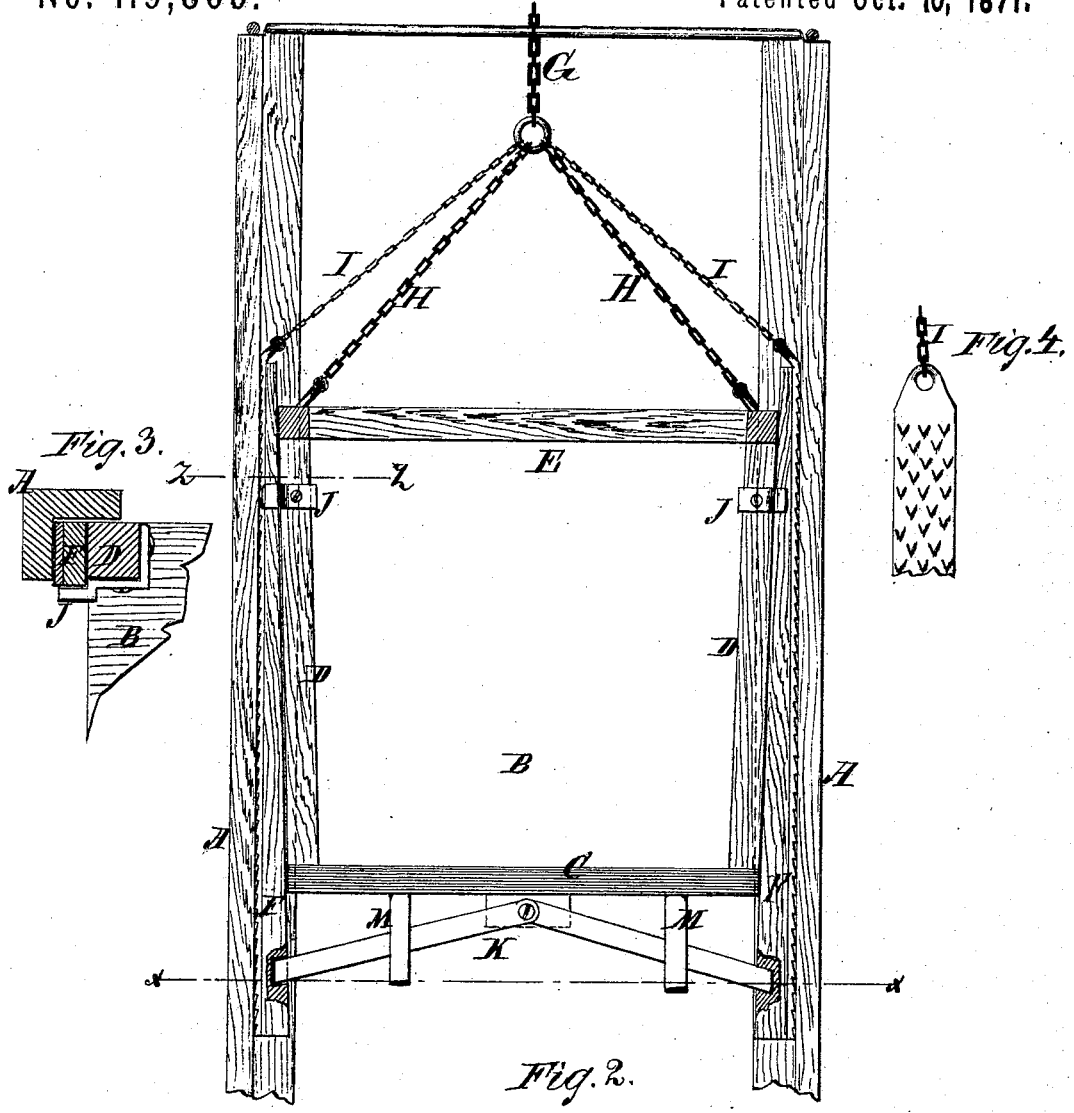
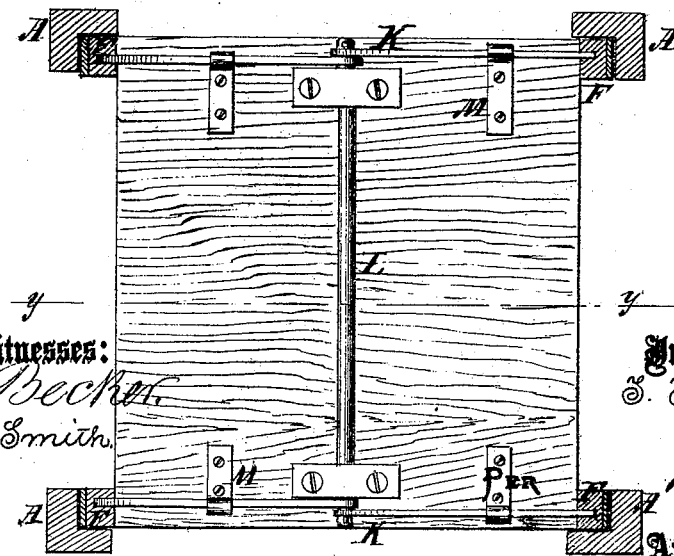
Witnesses: John Becker, Wm. H. C. Smith
Inventor: T. Thorn
Attorneys: Munn & Co.

UNITED STATES PATENT OFFICE.

THEODORE THORN, OF ST. CLAIR, PENNSYLVANIA.

IMPROVEMENT IN ELEVATOR-BRAKES.

Specification forming part of Letters Patent No. 119,800, dated October 10, 1871.

*To all whom it may concern:*

Be it known that I, THEODORE THORN, of St. Clair, in the county of Schuylkill and State of Pennsylvania, have invented a new and useful Improvement in Elevator-Brake; and I do hereby declare that the following is a full, clear, and exact description thereof, which will enable others skilled in the art to make and use the same, reference being had to the accompanying drawing forming part of this specification.

This invention relates to a new and useful improvement in a safety-brake for elevatort or platforms used for raising coal or other articles from mines or perpendicularly; and it consists in a beveled cage or platform-frame and in wedge-shape brake-blocks and jointed brake-bars operating in vertical rabbeted timbers, as hereinafter more fully described.

In the accompanying drawing, Figure 1 is a vertical section of the apparatus taken on the line *y y* of Fig. 2. Fig. 2 is a horizontal section of Fig. 1 taken on the line *x x*, showing the under side of the platform or cage. Fig. 3 is a section of Fig. 1 on the line *z z*. Fig. 4 is a section of the metal plate on one of the brake-blocks, showing the inside of the upper end.

Similar letters of reference indicate corresponding parts.

A represents the upright rabbeted timbers which guide the cage up and down. B is the cage, consisting of a floor or platform, C, and corner-posts D. The latter are connected together at the top by the square frame-work E. F represents the brake-blocks, of wedge form, with their small ends uppermost, placed in the rabbet of the timbers A and in contact with the upright posts D. The area of the floor or platform is less than that of the frame E, leaving wedge-shape spaces at each corner to receive the brake-blocks F, as seen in Fig. 1. G is the hoisting-chain, connected with the four corners of the cage by the chains H and with the top ends of the brake-blocks by the chains I, as represented. J represents guide-plates on the corners of the cage, which serve to keep the brake-blocks in place. K represents two pairs of bars, which are loosely connected with the stationary rod L beneath the floor B. M represents loop-guides, through which these bars pass. The outer ends of the bars K enter mortises in the brake-blocks, as seen in Fig. 1. The face of each of the brake-blocks is plated with metal, and the metal (iron or steel) is ragged or serrated, so that the blocks will readily catch in the rabbets.

The operation will be readily understood from the drawing. Should the hoisting-chain or rope break, the loaded cage would instantly wedge between the brake-blocks. The bars K would act as knuckle-joints and force the brake-blocks with their ragged faces against the guide-timbers A. In use there would be more or less play between the timbers and the brake-blocks and between the brake-blocks and the cage; but in case of a brake the cage would act instantly upon knuckle-joints and be arrested.

Having thus described my invention, I claim as new and desire to secure by Letters Patent—

A cage, B, having downwardly-converging posts which slide in guides J, and the long wedge-shaped brake-blocks, the said cage and blocks being both attached to a common hoister, G, in combination, as described, with mechanism K L, for the purpose specified.

THEODORE THORN.

Witnesses:
JNO. DAWSON,
GEORGE W. KEITER.   (79)